US008837044B2

(12) United States Patent
Borlinghaus et al.

(10) Patent No.: US 8,837,044 B2
(45) Date of Patent: Sep. 16, 2014

(54) DEVICE FOR CONTINUOUS ADJUSTMENT OF SPECTROMETER GAP WIDTHS

(71) Applicant: Leica Microsystems CMS GmbH, Wetzlar (DE)

(72) Inventors: Rolf Borlinghaus, Ilvesheim (DE); Irmtraud Steinmetz, Mannheim-Seckenheim (DE)

(73) Assignee: Leica Microsystems CMS GmbH, Wetzlar (DE)

(*) Notice: Subject to any disclaimer, the term of this patent is extended or adjusted under 35 U.S.C. 154(b) by 0 days.

(21) Appl. No.: 13/753,161

(22) Filed: Jan. 29, 2013

(65) Prior Publication Data
US 2013/0170023 A1 Jul. 4, 2013

Related U.S. Application Data

(63) Continuation of application No. PCT/EP2011/060695, filed on Jun. 27, 2011.

(30) Foreign Application Priority Data

Aug. 2, 2010 (DE) .......... 10 2010 036 790

(51) Int. Cl.
G02B 21/06 (2006.01)
(52) U.S. Cl.
USPC ........................................ 359/385
(58) Field of Classification Search
USPC ................................ 359/385, 894
See application file for complete search history.

(56) References Cited

U.S. PATENT DOCUMENTS

| 5,032,005 | A | 7/1991 | Woodruff | |
|---|---|---|---|---|
| 5,161,238 | A * | 11/1992 | Mehmke | 359/738 |
| 6,407,873 | B1 | 6/2002 | Tuchman | |
| 2005/0030607 | A1 * | 2/2005 | Niggl et al. | 359/232 |

FOREIGN PATENT DOCUMENTS

| DE | 3133828 A1 | 5/1982 |
|---|---|---|
| DE | 3818129 A1 | 11/1989 |
| DE | 4330347 A1 | 3/1995 |
| DE | 19902624 A1 | 9/1999 |
| DE | 10147481 A1 | 4/2003 |
| DE | 10257120 A1 | 7/2004 |
| DE | 10319776 A1 | 11/2004 |
| DE | 102007005790 A1 | 8/2008 |
| EP | 1498707 A1 | 1/2005 |

OTHER PUBLICATIONS

International Search Report from Corresponding International application No. PCT/EP2011/060695, filed Jun. 27, 2011, mailed Dec. 20, 2011.

* cited by examiner

Primary Examiner — Frank Font
(74) Attorney, Agent, or Firm — Patentbar International, P.C.

(57) ABSTRACT

A microscope (10) has an aperture arrangement (29) that, in order to limit the dimension of a light beam (41), comprises an aperture opening (37). The size of the aperture opening (37) is adjustable with the aid of a first aperture member (32) and a second aperture member (34). At least one of the two aperture members (32, 34) is movable relative to the other aperture member (32, 34). The aperture members (32, 34) are spaced apart from one another when the aperture opening (37) is closed.

10 Claims, 2 Drawing Sheets

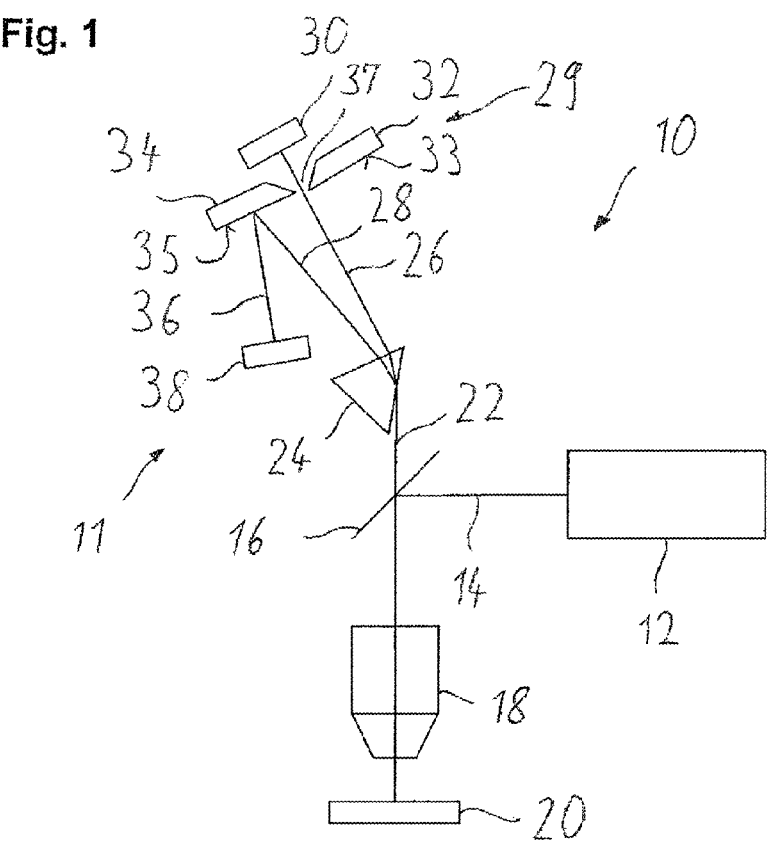

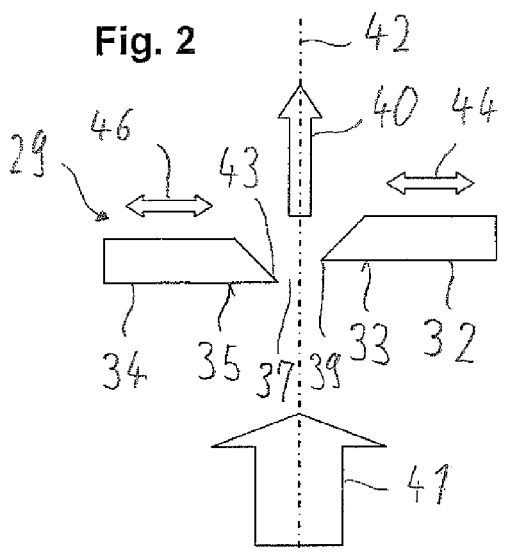
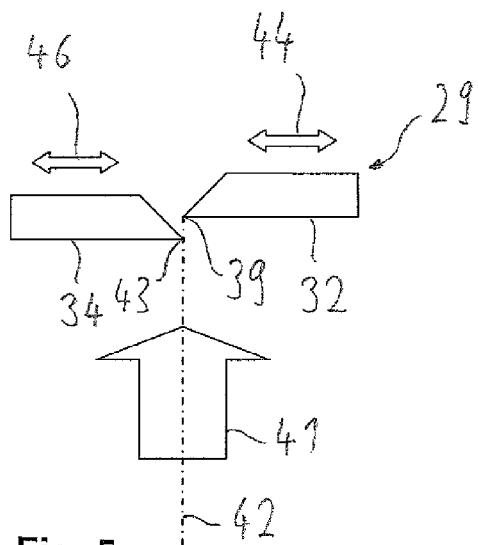
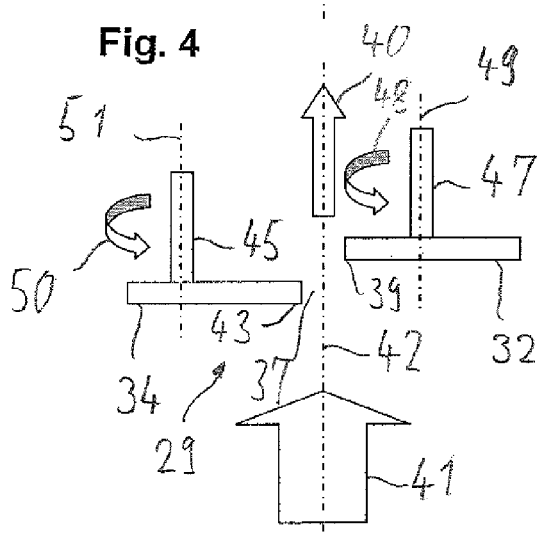
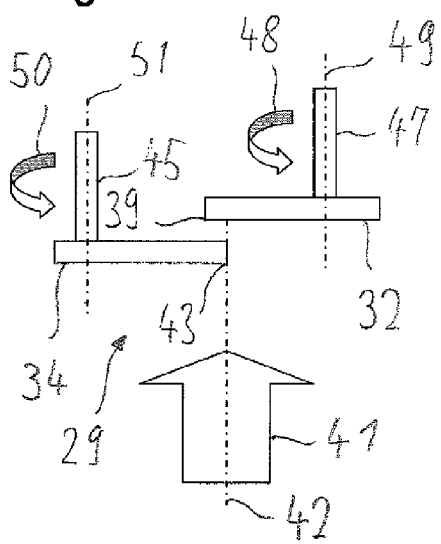
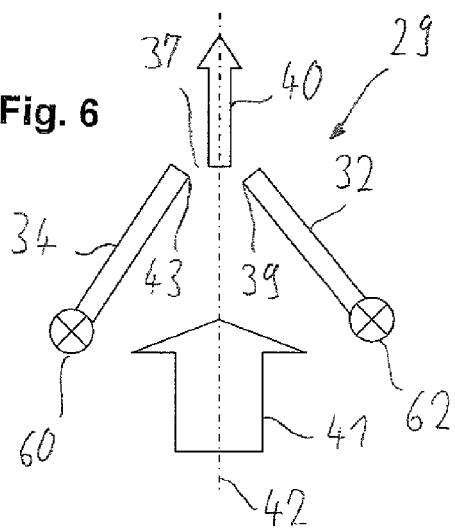
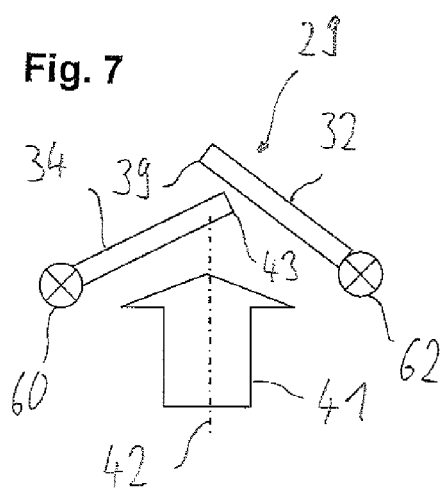

DEVICE FOR CONTINUOUS ADJUSTMENT OF SPECTROMETER GAP WIDTHS

FIELD OF THE INVENTION

The invention relates to a microscope having an aperture arrangement. The aperture arrangement comprises an aperture opening in order to limit the dimension of a light beam. The size of the aperture opening is adjustable with the aid of a first aperture member and a second aperture member. At least one of the two aperture members is movable relative to the other aperture member.

Aperture arrangements are often arranged within a microscope. The aperture arrangements serve to limit, in a radial direction, illumination light beams or detection light beams that extend in an axial direction. The aperture openings are, for example, slit-shaped, circular, or polygonal. Very small aperture openings, for example in the region of nanometers, can be generated with the aid of the aperture arrangement. With such small aperture openings the risk often exists that the aperture members which define the aperture openings will bump into one another, as a result of an irregularity in the application of control by positioning elements for adjusting the aperture members or as a result of production tolerances, and thus be damaged. This is problematic in particular when the aperture members are additionally equipped with reflective surfaces, since these can easily be damaged. The reflective surfaces serve, for example, to reflect the blocked-out portions of the light, for example to a further aperture arrangement or to an additional detector.

BACKGROUND OF THE INVENTION

DE 103 19 776 A1 discloses an apparatus for spectral selection and detection of the spectral regions of a light beam. The selection device encompasses means for spectral dispersion of the light beam, and means for blocking out a spectral region and for reflecting at least the blocked-out spectral region.

DE 199 02 624 A1 discloses an optical arrangement for spectral spreading of a light beam. The arrangement is arranged in the detection beam path of a confocal microscope. The light beam is focused onto a pinhole that has a polygonal passage.

DE 43 30 347 A discloses an apparatus for selecting and detecting two spectral regions of a light beam. The apparatus encompasses a selection device that has means for spectral dispersion of the light beam and means for blocking out a spectral region and reflecting the blocked-out spectral region.

SUMMARY OF THE INVENTION

The object of the present invention is to create a microscope that has an aperture arrangement with which very small aperture openings can be generated in a particularly reliable manner.

The object is achieved by the features of the independent Claim 1. Advantageous embodiments are indicated in the dependent claims.

The invention is notable for the fact that the aperture members are spaced apart from one another when the aperture opening is closed. The fact that the aperture opening is closed means in this connection that no portion of the light beam is passing through the aperture opening, and the aperture arrangement is thus completely occluding the light beam.

The result of the fact that the aperture members are spaced apart from one another when the aperture opening is closed is that the aperture members can be brought arbitrarily close to one another as the aperture opening becomes smaller, and the aperture opening can thus be made arbitrarily small. If the aperture members should happen, as a result of irregular control application or because of production tolerances, to be brought so close to one another that they overlap when viewed in the propagation direction of the light beam, they nevertheless do not bump into one another, thereby avoiding damage to the aperture members. The aperture opening can be, for example, circular, slit-shaped, or polygonal.

In an advantageous embodiment, the two aperture members are arranged with an offset from one another in the axial direction of the light beam to be limited. This allows particularly simple implementation of the fact that the aperture members are spaced apart from one another when the aperture opening is closed. Alternatively or additionally, only aperture edges of the aperture members can be arranged, when the aperture opening is closed, with an offset from one another in the axial direction of the light beam to be limited. This allows the aperture members to be arranged at the same height in an axial direction, but nevertheless allows a spacing between the aperture members to be implemented when the aperture opening is closed.

In order for the aperture opening to be closable, at least one of the aperture members is movable in a direction almost perpendicular, or perpendicular, to a beam axis of the light beam to be limited. Alternatively or additionally, one of the aperture members can be rotatable around a rotation axis that is almost parallel, or parallel, to the beam axis of the light beam to be limited. Alternatively or additionally, at least one of the aperture members is swingable around a swing axis that is almost perpendicular, or perpendicular, to the beam axis of the light beam to be limited.

One of the embodiments of the invention comprises a microscope having an aperture arrangement that, in order to limit a dimension of a first portion of a detection beam, comprises an aperture opening whose size is adjustable with the aid of a first aperture member and a second aperture member, at least one of the aperture members being movable relative to the other aperture member, and one side of the aperture members comprising a reflective region that reflects a second portion of the detection beam such that the first portion of the detection beam passes through the aperture opening, wherein the aperture members are spaced apart from one another when the aperture opening is closed and wherein the first portion has a first wavelength and the second portion has a second wavelength different from the first wavelength.

In a further embodiment of the invention, the aperture arrangement is part of a spectrometer that is arranged in the microscope. The aperture arrangement can be arranged, for example, in a detection beam path of the microscope. The microscope can be embodied as a laser microscope, as a confocal microscope, as a fluorescence microscope, multiphoton microscope, and/or as a scanning microscope.

BRIEF DESCRIPTION OF THE DRAWINGS

Exemplifying embodiments of the invention are explained in further detail below with reference to schematic drawings, in which:

FIG. 1 shows a microscope,

FIG. 2 shows a first embodiment of an aperture arrangement with the aperture opening opened, FIG. 3 shows the first embodiment of the aperture arrangement with the aperture opening closed, FIG. 4 shows a second embodiment of the aperture arrangement with the aperture opening opened, FIG. 5 shows the second embodiment of the aperture arrangement with the aperture opening closed, FIG. 6 shows a third embodiment of the aperture arrangement with the aperture opening opened, FIG. 7 shows the third embodiment of the aperture arrangement with the aperture opening closed.

Elements of identical design or function are labeled, throughout the Figures, with the same reference characters.

DETAILED DESCRIPTION OF THE PREFERRED EMBODIMENTS

FIG. 1 shows a microscope 10 having a spectrometer 11 and having a light source 12. Microscope 10 is a confocal laser microscope. Light source 12 is accordingly a laser that generates laser light at one, two, or more wavelengths, or with a continuous wavelength spectrum. In particular, light source 12 generates an illumination light beam 14 that is directed via a main beam splitter 16 and an objective 18 onto a sample that is arranged on a sample stage 20. Detection light proceeding from the sample passes through objective 18 and main beam splitter 16 toward a prism 24, in which context main beam splitter 16 separates a detection light beam 22 from illumination light beam 14. Prism 24 splits detection light beam 22 in accordance with wavelengths. In particular, at least one light beam 26 having a first wavelength and one light beam 28 having a second wavelength emerge from prism 24.

Light beam 26 of the first wavelength is limited, in its dimension perpendicular to its axial extension direction, with the aid of an aperture arrangement 29. Aperture arrangement 29 encompasses a first aperture member 32 and a second aperture member 34. The two aperture members 32, 34 define an aperture opening 37 through which a portion of first light beam 26 of first wavelength passes and is detected with the aid of a first detector 30. The two aperture members 32, 34 each comprise a reflective region 33, 35. Reflective regions 33, 35 serve to reflect light of wavelengths different from the first wavelength. In particular, light beam 28 of the second wavelength is reflected by reflective region 35 of second aperture member 34, so that a reflected light beam 36 strikes a second detector 38 and is detected there.

Alternatively or additionally, microscope 10 can comprise a scanning unit. Microscope 10 can moreover operate in a non-confocal manner. In particular, microscope 10 can acquire sample images using the transmitted light method. Microscope 10 can furthermore comprise many more aperture arrangements 29 so that light beams 26, 28 of different wavelengths can be distributed onto many more detectors, so that light beams 26, 28 of multiple different wavelengths are simultaneously detectable independently of one another.

In addition to the optical elements shown, such as e.g. aperture members 32, 34, further optical elements (not depicted for reasons of clarity) can preferably also be arranged, in particular further apertures or aperture members, pinholes, or lenses. In particular, for example, a lens can be arranged respectively between aperture members 32, 34 and first detector 30 and/or between main beam splitter 16 and prism 24.

FIG. 2 shows a first embodiment of aperture arrangement 29. A light beam 41 to be limited is directed, in the direction of reflective regions 33, 35, onto the two aperture members 32, 34. Light beam 41 to be limited proceeds along a beam axis 42. The light passes through aperture opening 37. The aperture opening is limited by the two aperture members 32, 34, in particular by a first aperture edge 39 of first aperture member 32 and by a second aperture edge 43 of second aperture member 34. A limited light beam 40 extends beyond aperture opening 37.

The size of aperture opening 37 is modifiable by adjusting the two aperture members. In particular, with the aid of a positioning element (not depicted), first aperture member 32 is movable in a first motion direction 44 and second aperture member 34 is movable in a second motion direction 46 perpendicular to beam axis 42. As long as limited light beam 40 passes through aperture opening 37, aperture opening 37 is referred to as "opened."

FIG. 3 shows the first embodiment of aperture arrangement 29 with aperture opening 37 closed. The fact that aperture opening 37 is "closed" means in this connection that no portion of light beam 41 to be limited passes through aperture opening 37. In other words, when aperture opening 37 is closed, aperture members 32, 34 are moved far enough toward one another that they overlap from the point of view of light beam 41 to be limited, so that light beam 41 can no longer pass through aperture opening 37. When aperture opening 37 is closed, the two aperture members 32, 34 are spaced apart from one another. This allows the two aperture members 32, 34 to slide so close to one another that aperture opening 37 can be arbitrarily small, and extends over only a few nanometers. If the two aperture members 32, 34 are moved even further toward one another as a result of production tolerances or irregular control application, a clearance then nevertheless exists before they bump into one another and might be damaged.

FIG. 4 shows a second embodiment of aperture arrangement 29 in which the two aperture members 32, 34 are rotatable. For this, first aperture member 32 is secured on a second mount 47 and second aperture member 34 is secured on a first mount 45. The two mounts 45, 47 are respectively rotatable in a first rotation direction 48 around a first rotation axis 49, and in a second rotation direction 50 around a second rotation axis 51. Aperture members 32, 34 are mounted eccentrically on mounts 45, 47, so that the size of aperture opening 37 can be varied by rotating the aperture members 32, 34. Aperture opening 37 is opened, so that light beam 41 to be limited passes at least in part through aperture opening 37, and limited light beam 40 propagates further beyond the aperture opening.

FIG. 5 shows the second embodiment of aperture arrangement 29 with aperture opening 37 in the closed state. In this exemplifying embodiment as well, the two aperture members 32, 34 are arranged with an offset from one another in the axial direction of beam axis 42. The result of this is once again that aperture members 32, 34 can make aperture opening 37 arbitrarily small without bumping into one another. In the closed position, no portion of light beam 41 to be limited passes through aperture opening 37.

FIG. 6 shows a third embodiment of aperture arrangement 29 with aperture opening 37 opened. In this embodiment, first aperture member 32 is swingable or pivotable around a second swing axis 62, and second aperture member 34 is rotatable or swingable around a first swing axis 60. The two swing axes 60, 62 preferably extend perpendicular to beam axis 42. The two aperture members 32, 34 are swung out far enough that aperture opening 37 is opened, and light beam 41 to be limited passes at least in part through aperture opening 37 in the form of limited light beam 40.

FIG. 7 shows the third embodiment of aperture arrangement 29 with aperture opening 37 closed. When aperture opening 37 is closed, once again no portion of light beam 41 to be limited passes through aperture opening 37, since aperture members 32, 34 are swung close to one another. The two aperture members 32, 34 are swung with respect to one another in such a way that aperture edges 39, 34 [sic: ?43] are arranged with an offset from one another in the axial direction of light beam 42 to be limited, so that despite production tolerances or an irregular application of control by positioning elements for adjusting a size of aperture opening 37 in the nanometer region, the two aperture members 32, 34 do not bump into one another and are thus spaced apart from each other when aperture opening 37 is closed.

The invention is not restricted to the exemplifying embodiments indicated. For example, instead of or in addition to prism 34, another or a further spectrally dispersing element can be provided. The individual exemplifying embodiments can furthermore be combined with one another. For example, one of the two aperture members 32, 34 can be rotatable or swingable, and the other of the two aperture members 32, 34 can be shiftable perpendicular to beam axis 42. Furthermore, one of the two aperture members 32, 34 can be swingable and the other rotatable. Moreover, for each aperture arrangement 29 one of the sides of aperture members 32, 34 can be reflective.

The size of aperture opening 37 can be adjusted, for example, with the aid of a software program stored on a control device. The software can be used interactively by way of a computer. The two detectors 30, 38, or optionally further detectors, can be read out with the aid of the software. Aperture openings 37 of aperture arrangements 29 associated with these detectors can moreover be adjusted individually.

PARTS LIST

- 10 Microscope
- 11 Spectrometer
- 12 Light source
- 14 Illumination light beam
- 16 Main beam splitter
- 18 Objective
- 20 Sample stage
- 22 Detection light beam
- 24 Prism
- 26 Light beam of first wavelength
- 28 Light beam of second wavelength
- 29 Aperture arrangement
- 30 First detector
- 32 First aperture member
- 33 Reflective region of first aperture member
- 34 Second aperture member
- 35 Reflective region of second aperture member
- 36 Reflected light beam
- 37 Aperture opening
- 38 Second detector
- 39 First aperture edge
- 40 Limited light beam
- 41 Light beam to be limited
- 42 Beam axis
- 43 Second aperture edge
- 44 First motion direction
- 45 First mount
- 46 Second motion direction
- 47 Second mount
- 48 First rotation direction
- 49 First rotation axis
- 50 Second rotation direction
- 51 Second rotation axis
- 60 First swing axis
- 62 Second swing axis

What is claimed is:

1. A microscope having an aperture arrangement that, in order to limit a dimension of a first portion of a detection beam, comprises an aperture opening whose size is adjustable with the aid of a first aperture member and a second aperture member, at least one of the aperture members being movable relative to the other aperture member, and one side of the aperture members comprising a reflective region that reflects a second portion of the detection beam such that the first portion of the detection beam passes through the aperture opening,
   wherein the aperture members are spaced apart from one another when the aperture opening is closed and wherein the first portion has a first wavelength and the second portion has a second wavelength different from the first wavelength.

2. The microscope according to claim 1, in which the two aperture members are arranged with an offset from one another in an axial direction of the first portion of the detection beam.

3. The microscope according to claim 1, in which, when the aperture opening is closed, aperture edges of the aperture members are arranged with an offset from one another in an axial direction of the first portion of the detection beam.

4. The microscope according to claim 1, in which, for adjustment of the size of the aperture opening, at least one of the aperture members is movable in a direction almost perpendicular, or perpendicular, to a beam axis of the first portion of the detection beam.

5. The microscope according to claim 1, in which, for adjustment of the size of the aperture opening, at least one of the aperture members is rotatable around a rotation axis that is almost parallel, or parallel, to a beam axis of the first portion of the detection beam.

6. The microscope according to claim 1, in which, for adjustment of the size of the aperture opening, at least one of the aperture members is swingable around a swing axis that is almost perpendicular, or perpendicular, to a beam axis of the first portion of the detection beam.

7. The microscope according to claim 1, which comprises a spectrometer that encompasses the aperture arrangement.

8. The microscope according to claim 1, in which the aperture arrangement is arranged in a detection beam path of the microscope.

9. The microscope according to claim 1, in which at least one of the aperture members is embodied in circular, round, polygonal, quadrangular, rectangular, or square fashion.

10. The microscope according to claim 1, which is embodied as a laser microscope, as a confocal microscope, as a fluorescence microscope, multiphoton microscope, and/or as a scanning microscope.

* * * * *